Patented Apr. 5, 1932

1,852,014

UNITED STATES PATENT OFFICE

DAVID L. JACOBSON, OF PITTSBURGH, PENNSYLVANIA, ASSIGNOR TO THE KOPPERS COMPANY, A CORPORATION OF DELAWARE

GAS PURIFICATION

No Drawing. Application filed February 23, 1929. Serial No. 342,316.

My invention relates to the purification of gases, such as coal gas, water gas, air, or the like, from hydrogen sulphide and analogous impurities, including such analogous acidic impurities as hydrogen cyanide.

An object of my invention is to provide an improved process of purifying a gas in which sulphur removed from the gas in the form of such an impurity as hydrogen sulphide is largely recovered in elemental form, and whereby an essential element of the purifying medium may be derived from the gas itself or supplied in the form of a relatively inexpensive substance.

A further object of my invention is to provide an improved process of purifying gas as above recited in which the purifying medium employed is capable of high efficiency with respect to the absorption of said impurities, and is capable of being regenerated for further use without difficulty.

My invention has for further objects such other operative advantages and results as may hereinafter be found to obtain.

My invention relates to a process wherein the gas to be purified is treated with a solution containing ammonia and arsenic, preferably in the form of a compound of the same; for example, a compound of ammonia and an acid of arsenic, such as an ammonium arsenate or arsenite.

Such a solution may be and preferably is recirculated through a cycle comprising an absorption stage in which it is brought into contact with the gas for purification thereof from impurities comprising sulphur compounds and analogous impurities, and an actification stage in which the liquid is regenerated for further use by treatment with an oxygen-containing gas and a greater portion of the sulphur removed from the gas in the form of hydrogen sulphide or the like is recovered in elemental form and removed as such from the solution.

Without limiting my invention to any particular chemical theory or chemical substance, but merely by way of explanation, it may be said that the composition of the active compound in the solution may be represented by the formula of a suitable compound, for example, an ammonium arsenate or an ammonium thioarsenate. For example, if such a solution as is described herein were actified to the full extent theoretically possible, the composition of the active compound therein might be represented by the formula $(NH_4)_2HAsO_4$, and if this same solution were completely sulphided, the composition of the active compound might then be represented by the formula $(NH_4)_2HAsS_4$.

In practice, however, as is common to most cyclic gas purification processes, the solution employed in the cycle is not completely fouled nor completely actified in ordinary practice. For example, under some conditions of operation the composition of the active compound in the actified solution might be represented by the formula $$(NH_4)_2HAsS_2O_2,$$

whereas the composition of the active compound in the fouled solution might be represented by the formula $(NH_4)_2HAsS_3O$.

Obviously, such illustrative formulae are descriptive merely and do not necessarily designate actual chemical combinations. Nor do these formulae indicate the presence of such compounds as ammonium thiosulphate and ammonium thiocyanate.

The use of solutions containing ammonia and arsenic for gas purification has been described and claimed in the copending application of Herbert A. Gollmar, Serial No. 342,317, filed of even date herewith.

I have found however that when such a solution containing ammonia and arsenic is employed for gas purification, it is important to limit the amount of ammonia contained by the solution to such an amount that the solution will have substantially no vapor pressure with respect to ammonia.

For example, the solution should contain ammonia in such amount that the gas in contact and in equilibrium with the solution will contain not more than about 0.05% of ammonia by volume. As this amount of ammonia is scarcely detectable by the senses and is in fact extremely low as regards ammoniacal solutions in general, the solution may, for the purposes of the present invention, be regarded as having substantially no vapor pressure with respect to ammonia.

In carrying out my process, I ordinarily prefer to wash the gas with a solution containing about 1% of arsenic considered as $As_2O_3$, and containing sufficient ammonia to react with substantially all of the arsenic present without providing such an excess of ammonia, either in free or combined form, that it will impart to the solution a substantial vapor pressure with respect to ammonia.

In general, this result may be obtained if the solution contains a thio-arsenic compound of ammonia in which the ratio of ($NH_4$) radicles to (As) atoms is not more than two to one. This ratio between the ammonia and arsenic present should be maintained regardless of whether the ammonia is in actual combination with the arsenic or not, but neglecting ammonia present in the form of fixed compounds, such as ammonium thiosulphate and ammonium thiocyanate, having substantially no vapor pressure with respect to ammonia. That is to say that the above ratio applies to the ammonia actually combined with the arsenic or present in the form of a compound capable of exerting a substantial vapor pressure with respect to ammonia, but not to ammonia in the form of compounds other than compounds of arsenic having substantially no vapor pressure.

The solution may be prepared by dissolving an arsenic compound, for example, arsenous oxide, ammonium arsenate or ammonium arsenite, in water or a dilute ammoniacal solution in the amounts and proportions stated, and treating the gas with it. Upon contact with the gas containing sulphur impurities, for example, hydrogen sulphide, there is formed in the solution what may be termed a thio-compound of ammonium and arsenic, the solution of which is capable of absorbing further quantities of hydrogen sulphide and analogous impurities and of being regenerated for further use by oxidation as, for example, by treatment of the fouled solution with an oxygen-containing gas, such as air. Accordingly, this solution may be and preferably is employed in a cyclic process comprising an absorption stage and an actification stage, as hereinabove recited.

In the actification stage of the recirculating cycle, the oxidation of the fouled solution causes the liberation of the absorbed sulphur impurities, principally in the form of elemental sulphur which is largely removed by flotation or other suitable means, depending upon the type of apparatus employed, before the solution is returned to the absorption stage for the treatment of further quantities of gas.

Enough arsenic compound is added to the solution to maintain the stated amount of arsenic thereof by compensating for mechanical losses. Enough ammonia is added from time to time or continuously, either as such or in the form of a suitable compound, to maintain the stated proportion and amount of ammonia in the solution, and to compensate for mechanical losses, and also for ammonia consumed by side reactions such, for example, as those resulting in the formation of ammonium thiosulphate and ammonium thiocyanate.

As in most other gas purification processes, the latter compounds tend to accumulate in the solution and in order to prevent undue concentration thereof, portions of the solution are withdrawn from time to time and discarded or treated for the recovery of valuable constituents thereof in any known manner.

The ammonia added to the system may be supplied from an external source as, for example, in the form of an ammonium compound, such as ammonium hydroxide or ammonium arsenite, but is preferably derived from the gas being purified when that gas is of such character as to represent a source of ammonia. However, in the latter instance, it is necessary to limit the amount of ammonia contained by the gas so that the ammonia absorbed by the solution will not be excessive in amount, and for this purpose the procedure described and claimed in the copending application, Serial Number 502,668, filed December 16, 1930, of Bragg, Wilson and Jacobson may be followed to advantage.

The advantages resulting from the operation of a gas purification process of the nature indicated in the manner herein set forth comprise principally the maintenance of high efficiency with respect to the absorption of impurities from the gas being purified, and in the maintenance of desirable conditions in the actification stage.

With respect to the former, I have found that the presence of quantities of ammonia higher than those herein stated cause a considerable reduction in the absorbing efficiency of the solution, and with respect to the latter, the use of a solution having a considerable vapor pressure with respect to ammonia causes the liberation of large quantities of ammonia into the atmosphere in the actification stage, which is most undesirable.

Under such conditions, ammonia may also be liberated from the solution into the gas being purified, depending upon the initial vapor pressure in the gas, and this condition may also be very undesirable, both from the standpoint of waste and quality and the characteristics of the purified gas, whereas according to my invention, those difficulties are avoided.

A further advantage of the present invention resides in the fact that the actification apparatus employed need not be closed, but may be of an open and accessible type less expensive to construct and subject to less operating difficulties than the apparatus which would be required for the actification of solutions having a considerable vapor pressure with respect to ammonia.

My invention is not limited to the specific example or examples given hereinabove by way of illustration, but may be variously embodied and practiced within the scope of the claims hereinafter made.

I claim as my invention:

1. The process of purifying a gas by removing therefrom acidic impurities, which comprises washing the gas with a solution containing ammonia and arsenic, but having substantially no vapor pressure with respect to ammonia.

2. The process of purifying a gas by removing therefrom acidic impurities, which comprises washing the gas with a solution containing arsenic and sufficient ammonia to react with the arsenic to form a regenerable sulphur absorbent compound but insufficient to cause the solution to have a substantial vapor pressure with respect to ammonia.

3. The process of purifying a gas by removing therefrom acidic impurities comprising sulphur compounds, which comprises washing the gas with a solution of a thioarsenic compound of ammonia and having substantially no vapor pressure with respect to ammonia.

4. The process of purifying a gas by removing therefrom acidic impurities, which comprises washing the gas with a solution containing a compound of arsenic and ammonia, in which the proportion of $(NH_4)$ radicles to (As) atoms is not more than about two to one.

5. The process of purifying a gas by removing therefrom acidic impurities comprising sulphur compounds, which comprises washing the gas with a solution of a thio-compound of ammonia and arsenic, and containing arsenic in amount equivalent to about one percent of $As_2O_3$ and ammonia in amount sufficient to react with substantially all of the arsenic present but insufficient to impart to the solution a substantial vapor pressure with respect to ammonia.

6. The cyclic process of purifying a flowing gas by removing therefrom acidic impurities, which comprises recirculating a solution containing ammonia and arsenic but having substantially no vapor pressure with respect to ammonia through an absorption stage for purification of the gas and an actification stage in which the liquid is regenerated for further use with separation of free sulphur.

7. The process of purifying a gas by removing acidic impurities therefrom which comprises washing the gas with a solution containing a compound of arsenic and ammonia, in which compound the arsenic and ammonia are present in such ratio as to impart to the solution substantially no vapor pressure with respect to ammonia.

In testimony whereof, I have hereunto subscribed by name this 20th day of February, 1929.

DAVID L. JACOBSON.